United States Patent [19]
Klein

[11] Patent Number: 6,044,474
[45] Date of Patent: Mar. 28, 2000

[54] MEMORY CONTROLLER WITH BUFFERED CAS/RAS EXTERNAL SYNCHRONIZATION CAPABILITY FOR REDUCING THE EFFECTS OF CLOCK-TO-SIGNAL SKEW

[76] Inventor: Dean A. Klein, 1473 Parkforest Way North, Eagle, Id. 83616

[21] Appl. No.: 08/826,827

[22] Filed: Apr. 8, 1997

[51] Int. Cl.[7] .................................................. G06F 1/04
[52] U.S. Cl. ........................................ 713/400; 713/503
[58] Field of Search .................................. 395/551, 552, 395/558, 559; 711/100, 167; 713/400, 401, 503, 600

[56] References Cited

U.S. PATENT DOCUMENTS

| | | | |
|---|---|---|---|
| 4,858,178 | 8/1989 | Breuninger | 364/900 |
| 5,291,580 | 3/1994 | Bowden, III et al. | 395/425 |
| 5,615,355 | 3/1997 | Wagner | 395/494 |
| 5,692,165 | 11/1997 | Jeddeloh et al. | 395/551 |
| 5,819,076 | 10/1998 | Jeddeloh et al. | 395/552 |
| 5,857,095 | 1/1999 | Jeddeloh et al. | 395/552 |

*Primary Examiner*—Dennis M. Butler

[57] ABSTRACT

Clock-to-signal skew has largely been accepted and tolerated as a design issue; a memory controller that addresses the issue is described. The memory controller is configurable to operate either in a high-performance mode with external synchronization or in a normal mode. In high-performance mode, the memory controller generates a memory control signal, one clock cycle earlier than it would in normal mode, as input for a register. The register buffers the (early) signal. An external clock signal serves as a synchronization event; that is, the clock signal synchronizes the memory control signal by causing the register to output that signal at a more precisely controlled time than might otherwise occur using the memory controller alone. Thus, the use of the external clock signal helps compensate for the effects of clock-to-signal skew; multiple external synchronization registers may also be used.

15 Claims, 10 Drawing Sheets

HIGH PERFORMANCE MODE

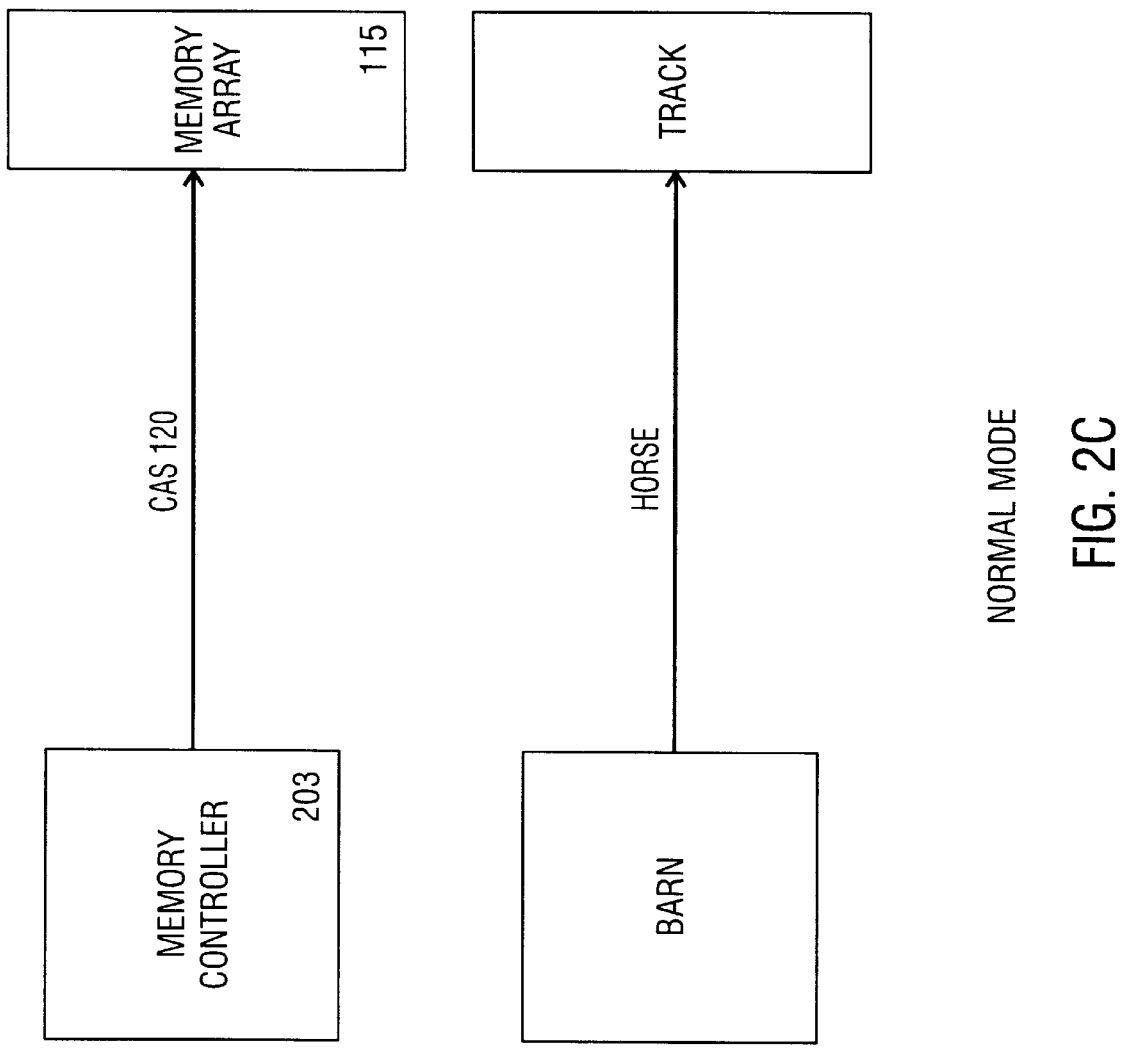

| BIT | BIT 7 | BIT 6 | BIT 5 | BIT 4 | BIT 3 | BIT 2 | BIT 1 | BIT 0 |
|---|---|---|---|---|---|---|---|---|
| FUNCTION | B3_R_P | B2_R_P | B1_R_P | B0_R_P | B3_C_P | B2_C_P | B1_C_P | B0_C_P |
| DEFAULT | 0 | 0 | 0 | 0 | 0 | 0 | 0 | 0 |

PERFORMANCE CONTROL REGISTER 600

MEMORY CONTROLLER WITH BUFFERED CAS/RAS EXTERNAL SYNCHRONIZATION CAPABILITY FOR REDUCING THE EFFECTS OF CLOCK-TO-SIGNAL SKEW

1. BACKGROUND OF THE INVENTION

This invention relates in general to the field of computing and, more particularly, to the use of a programmable memory controller to reduce the effects of clock-to-signal skew by providing for external synchronization of memory control signals.

1.1 Microprocessors, Memory Addresses, and Memory Controllers

Referring to FIG. 1A, a memory controller 103 is an essential part of a typical modern computer system 100. The memory controller performs address conversions as described below.

The microprocessor 110 in the computer system can perform little if any usefull work without reading and writing to an external memory device such as a memory array 115. When the microprocessor needs to access the memory array (i.e., to read data from or write data to the memory array), it generates an address signal on an address bus 107. The address signal encodes an address that corresponds to a particular location in a memory array that is of interest to the microprocessor. (Address signals are sometimes referred to colloquially, in the industry and in this specification, as simply addresses.)

Referring to FIG. 1B, the address generated by the microprocessor 110 is usually a sequential address; it may specify a memory location referred to as 0001H (with "H" referring to hexadecimal notation), 0002H, etc. Most conventional dynamic random access memories, however, are physically divided into rows and columns. Data is physically read from or written to a particular memory location by specifying a row address and a column address.

The address generated by the microprocessor 110 typically is not in such a row/column format. As is well known in the art, therefore, the memory controller 103 converts the microprocessor-generated sequential address (e.g., 0002H) into a row/column address format (e.g., row 1, column 2) that is suitable for a particular memory array.

Referring back to FIG. 1A, conventionally a physical memory array access cycle begins when the microprocessor 110 sends an address signal to the memory controller 103 on address line 107. The memory controller 103, acting as an address translator, generates a row address strobe (RAS) memory control signal on RAS line 111 and a column address strobe (CAS) memory control signal on line 120. The RAS memory control signal 111 and the CAS memory control signal 120 are received by the memory array 115.

Within the memory array 115, a row decoder, not shown, receives the RAS memory control signal 111, identifies the requested row, and activates the appropriate word line which "turns on" the transistors on that row. Activation of the transistors enables the charge stored in the capacitors connected to the activated word line to be passed onto the corresponding bit lines. Similarly, a column decoder within the memory array 115, not shown, selects the bit line for the requested column. The information contents of the memory array at the specified row and column are then transmitted to the microprocessor via the data bus 130.

1.2 The Problem of Clock-to-Signal Skew in Memory Systems

Memory controllers are conventionally implemented using application-specific integrated circuits (ASICs). While ASICs may perform certain operations very rapidly, it is often difficult to control clock-to-signal skew in a large ASIC.

Generally speaking, clock-to-signal skew is the time difference between a clock-edge and a signal of interest. For example, if the clock signal has just gone high (i.e., reached its maximum) and the signal of interest has just gone low (i.e., reached its minimum) the time difference between the present edge of the clock and the signal would be the clock-to-signal skew.

Clock-to-signal skew increases signal propagation delay and makes it difficult to guarantee timing of signals and, thus, the availability of data at a given clock edge. Clock-to-signal skew increases with the physical size of an application-specific integrated circuit, with the capacitance of the ASIC output pad, and with the number and capacitance of the devices that are driven by the ASIC.

Clock-to-signal skew can result in a loss of computer performance. For example, high clock-to-signal skew makes it difficult to interface optimally with synchronous DRAM (dynamic random access memory) and EDO (extended data out) DRAM. The cost sensitive nature of some computer systems may not allow the expense of registers. Therefore, a designer of a memory controller may be required to delay the sampling of data in order to essentially assure that data from the memory array 115 is available at a given clock-edge. This delay can increase the access time of the memory array 115 and degrade the performance of the computer system.

In a given computer, the number of memory devices 115 linked to a memory controller 103, and thus the amount of clock-to-signal skew the computer is likely to experience, may be subject to change. For example, the owner or user of a PC-type personal computer with 8 megabytes of random-access read-write memory (RAM) may install additional memory to bring the machine to 16, 24, 32, or even 128 megabytes. Consequently, the exact memory size of a particular computer cannot be accurately predicted at the time the computer is manufactured.

As a result, a designer of a memory controller 103 may well know the clock-to-signal skew within the memory controller per se, but may not know the number of devices or the size of memory array 115 coupled to the memory controller. Hence, the designer will not know the aggregate capacitance of the memory array 115 that is coupled to the memory controller 103.

2. SUMMARY OF THE INVENTION

Clock-to-signal skew has largely been accepted and tolerated as a design issue; the invention relates to a memory controller that addresses the issue instead. The memory controller is configurable to operate either in a high-performance mode with external synchronization or in a normal mode. In high-performance mode, the memory controller generates a memory control signal, one clock cycle earlier than it would in normal mode, as input for a register. The register buffers the (early) signal. An external clock signal serves as a synchronization event; that is, the clock signal synchronizes the memory control signal by causing the register to output that signal at a more precisely controlled time than might otherwise occur using the memory controller alone. Thus, the use of the external clock signal helps compensate for the effects of clock-to-signal skew; multiple external synchronization registers may also be used.

3. BRIEF DESCRIPTION OF THE DRAWINGS

FIGS. 2B and 2C illustrate by analogy some of the functional aspects of that embodiment.

FIG. 6 illustrates a performance control register utilized in programming a memory subsystem in accordance with the invention.

4. DETAILED DESCRIPTION OF SPECIFIC EMBODIMENTS

Illustrative embodiments of the invention are described below as they might be employed in reducing clock-to-signal skew. In the interest of conciseness, not all the features of an actual implementation are described in this specification. It will of course be appreciated that in the development of any such actual embodiment numerous implementation-specific decisions must be made to achieve the developers' specific goals, such as compliance with system-related and business-related constraints. Moreover, it will be appreciated that even if such a development effort might be complex and time-consuming it would be a routine undertaking for those of ordinary skill having the benefit of this disclosure.

4.1 Illustrative Memory Controller Structure

Figure 1A:
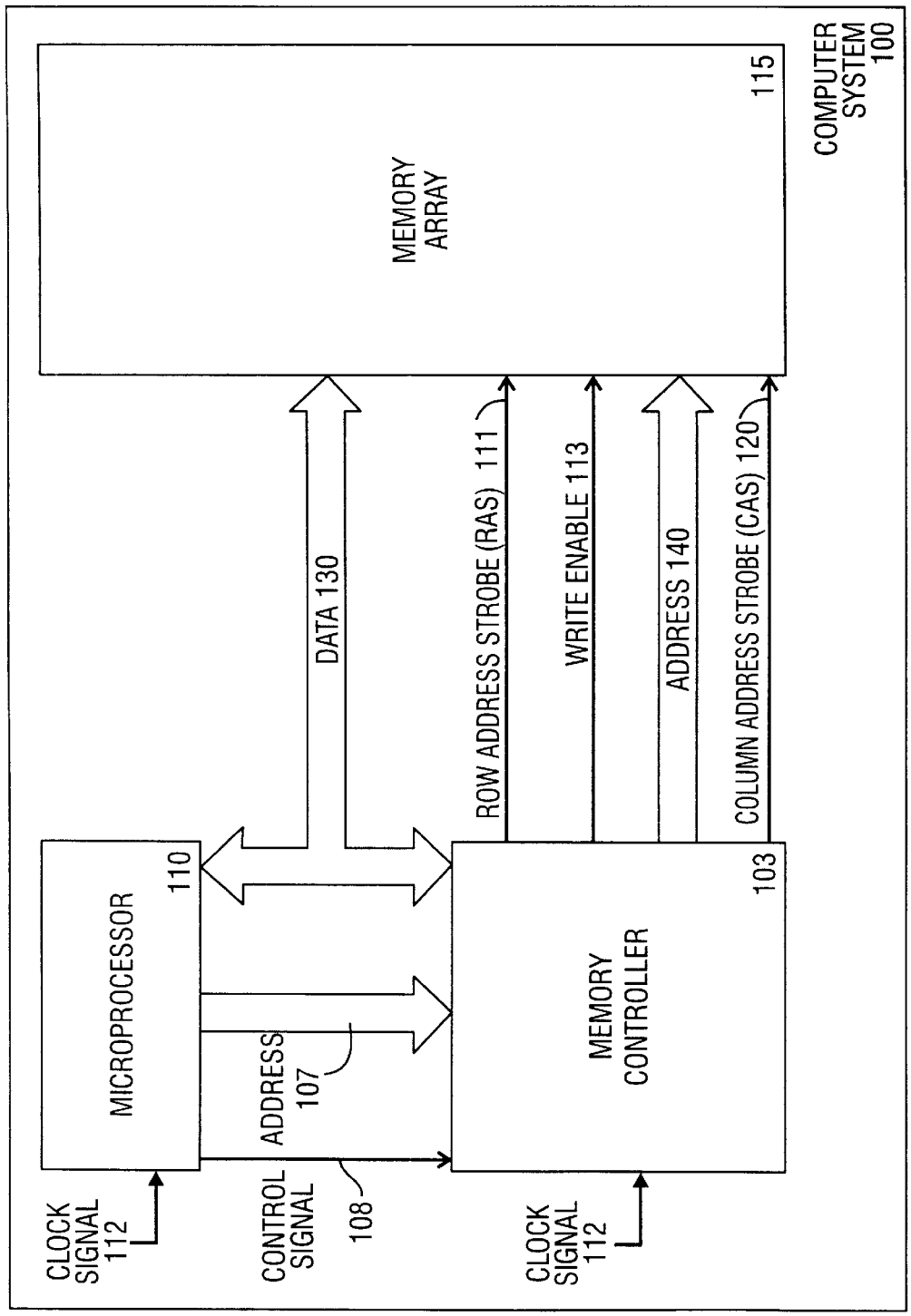
FIG. 1A is a high-level block diagram of a conventional computer system.
Figure 1B:
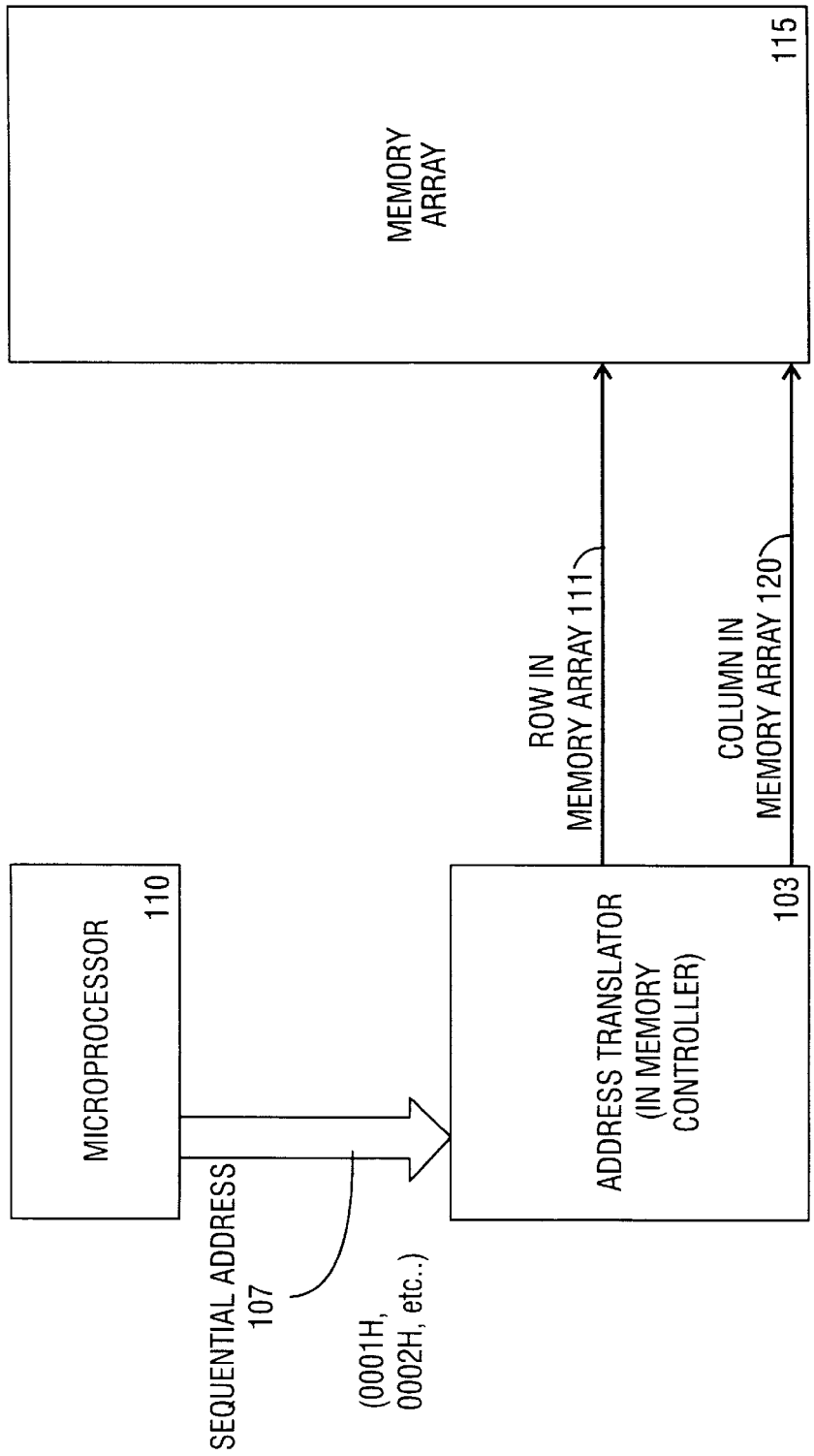
FIG. 1B is a simplified block diagram illustrating some of the address-translation aspects of a memory controller in the computer system.
Figure 2A:
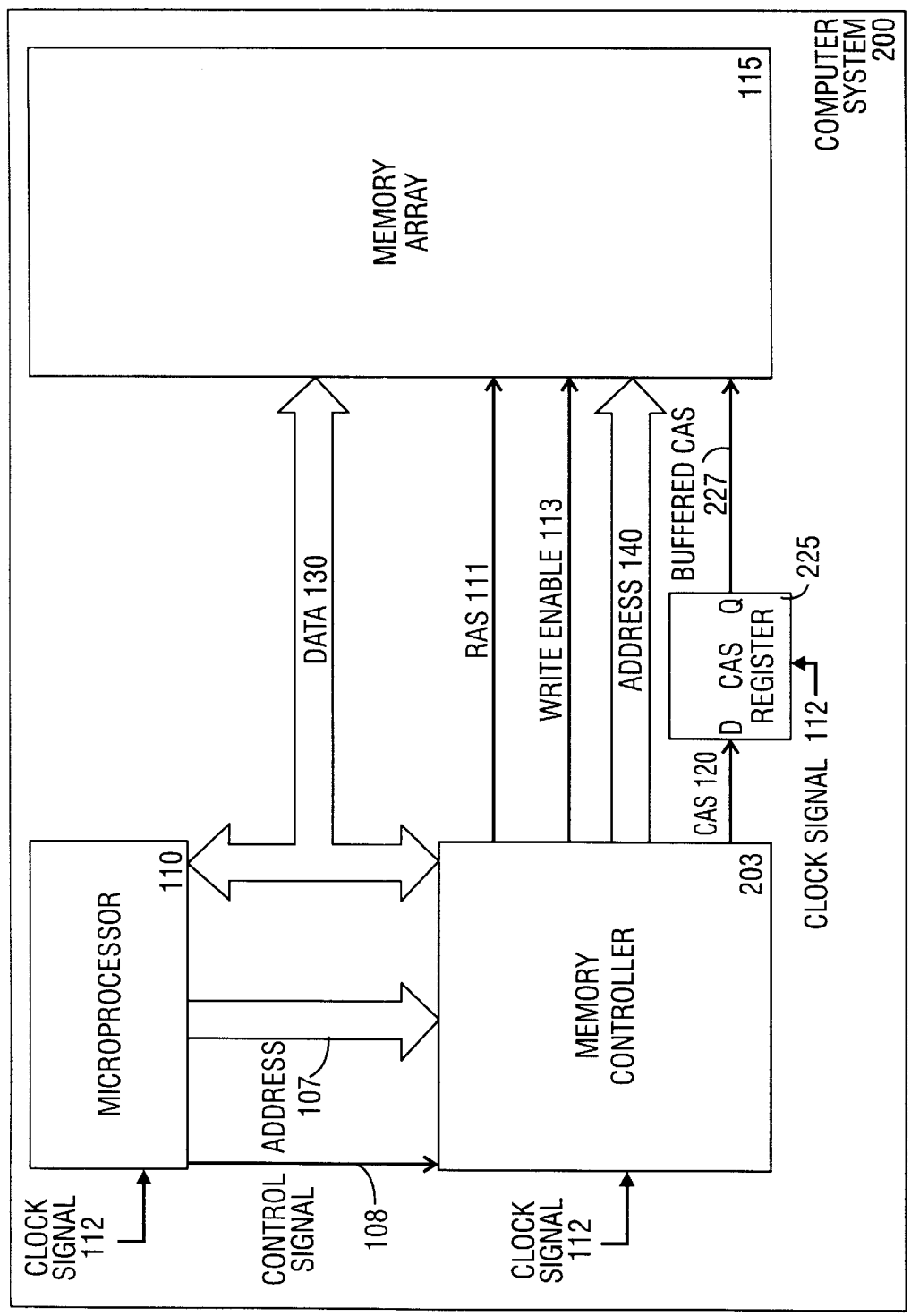
FIG. 2A is a block diagram of a CAS-register embodiment of the invention.

FIG. 2A illustrates one embodiment of the invention in an improved computer system 200. The components shown in FIG. 2A are physically connected and configured to function in the manner described below when the computer system is operated. This is referred to as being "operatively coupled" to function in the manner described.

(It is to be understood that when components in a system are described in this specification as being "operatively coupled" or "configured" in a certain way, it does not mean that the components are necessarily being operated or even that they are connected to a source of electric power. Components in a system are operatively coupled or configured to function in a particular way, even with the power off, if they can be operated in the manner described, possibly with some preparatory configuration operations such as software loading, when the system itself is operated.)

The illustrative computer system 200 includes a microprocessor 110 receiving a clock signal 112; an address line 107; a control line 108; a data line 130; a memory controller 203; a memory array 115; and other typical conventional components. The microprocessor 110 may be any general purpose microprocessor such as an Intel x86 compatible microprocessor, a Motorola Power PC microprocessor, a DEC Alpha microprocessor, a MIPS microprocessor, etc. In addition, the microprocessor 110 may be a special purpose processor such as a DSP (digital signal processor) or a graphics processor.

It is to be understood, however, that the invention is not limited to the use of a microprocessor. The microprocessor of the illustrative computer system 200 is an example of a "bus master," meaning that it issues read and write transactions on a bus. As is well known in the art, a system may include many types of bus masters, not all of which are processors, as well as several types of buses. Such alternative types of bus masters may be conventionally substituted for the microprocessor 110 in the computer system 200.

The memory controller 203 is an ASIC whose inputs include to the microprocessor's address line 107, control line 108, and data line 130, as well as the clock signal 112. The outputs of the memory controller 203 include an RAS memory control signal on an RAS line 111, a high-performance CAS memory control signal on CAS line 221, and an address signal on address line 140.

The memory array 115 may be any conventional memory array; it may take the form of RAM; read-only memory (ROM); a programmable ROM (PROM); an erasable PROM (EPROM); an electrically erasable PROM (EEPROM); a flash memory; etc. A memory array typically consists of several banks of memory. In some applications it may be useful for the memory array 115 to take the form of synchronous dynamic RAM (DRAM) or extended data out (EDO) DRAM.

The memory array 115 is configured to receive, from the memory controller 203, RAS memory control signals on line 111; address signals on address lines 140, and a write-enable signal on line 113. In addition, the memory array 115 has data lines that are coupled to the data lines 130 of the microprocessor 110 and/or the memory controller 203, enabling data that is placed on the input/output line 130 to be routed to or from the microprocessor. As would be apparent to one of ordinary skill in the art, one or more registers (not shown) clocked by the clock signal 112 may be inserted to enable data to flow through the memory controller 203. Such registers may be used to buffer write data from the CPU or other devices, or to synchronize read data. In addition the CPU and memory may be of different interface voltages or technologies, necessitating signal conversion between the devices.

As noted above, the prior-art system 100 includes a CAS line 120 going directly from the memory controller 103 to the memory array 115. In contrast, in this illustrative embodiment of the invention, in a high-performance system with a large amount of memory, the CAS signal is buffered by a CAS register 225 interposed between the CAS line 120 and the memory array 115. The CAS register 225 may be any conventional register. An edge-triggered D (i.e., data) flip-flop may be used. A 74FCT374CTQ is an excellent register for this purpose, having low-input capacitance, good drive capability, and low cost. On the other hand, in a system without a large amount of memory, the CAS register 225 may be omitted, thus enabling use of a single controller design for multiple application.

4.2 Operation of the Illustrative Memory Controller Structure

The memory controller 203 is operated in one of two modes, referred to as a high-performance mode and a normal mode. As will be apparent to those of ordinary skill in the art having the benefit of this disclosure, conventional methods applied in other contexts (e.g., chip-set configuration registers, PCI configuration registers, or pinstrapping) may be used to select a mode of operation.

When the microprocessor 110 of the system 200 needs to access a memory array 115, it generates an address on its address lines 107 in the usual way. Conventional logic circuitry within the memory controller 203, not shown, decodes the address data, memory bank sizes and ranges. If the address data corresponds to an address within a predetermined address range within the memory array 115 as determined by bank addressed and registers shown in FIG. 6, then the memory controller 203 proceeds in high-performance mode, otherwise in normal mode.

In high-performance mode (e.g., in a system with a large amount of memory and a CAS register 225), the memory controller 203 generates a CAS memory control signal 120 one clock cycle earlier than it otherwise would (i.e., one clock cycle earlier than it would in normal mode). The "early" signal 120 is received and temporarily buffered by the CAS register 225. That register (which, as a D flip-flop, operates as a synchronous device) temporarily stores the CAS memory control signal until a clock-edge is detected in the clock signal 112. When the clock signal 112 transitions (i.e., changes from low to high or vice versa), the CAS register 225 generates an output signal 227 whose logic level is the same as the input on the line 120 prior to the transition. In the case of very large memory arrays, several CAS registers 225 may be used in parallel.

In effect, in high-performance mode the memory controller 203 gives the CAS memory control signal 120 a head start by pre-positioning it into the CAS register 225 one clock cycle early. The pre-positioned signal is then sent to the memory array 115 at a precisely controlled time determined by the clock signal 112.

Figure 2B:
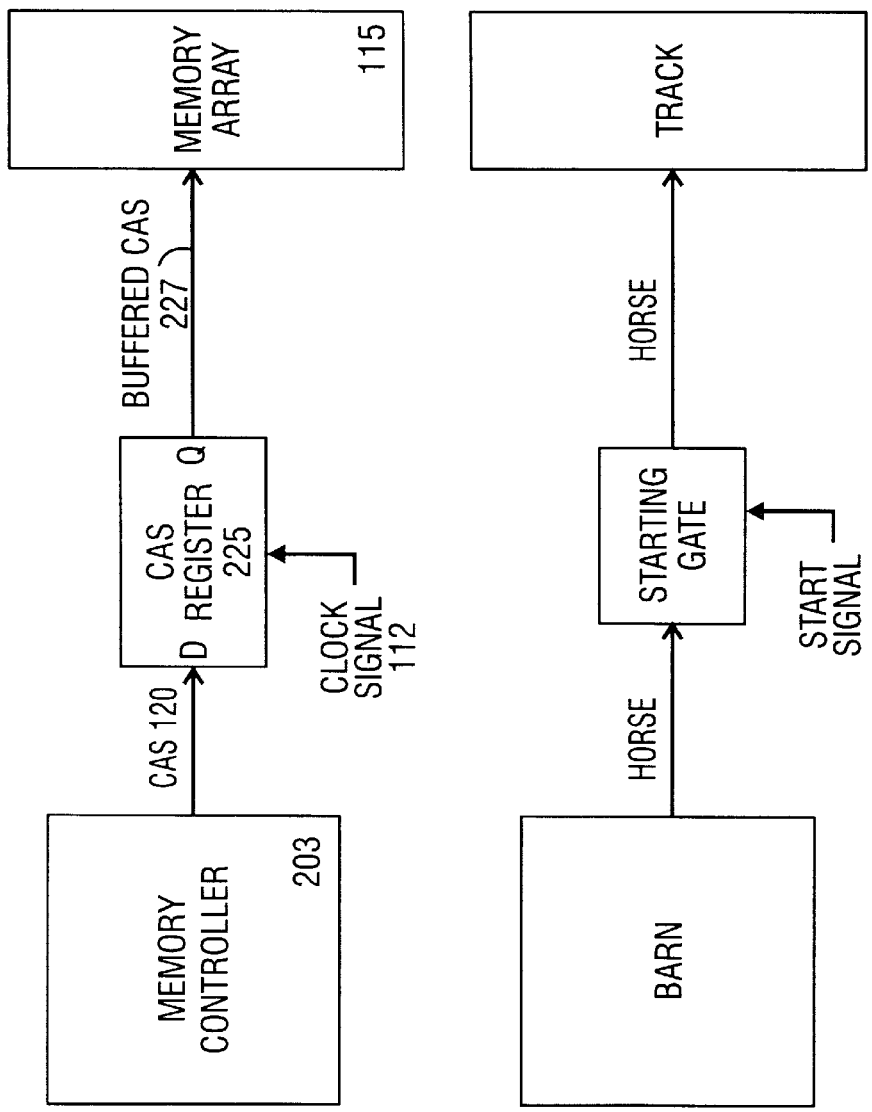

As shown in FIG. 2B, this is roughly analogous to a racehorse (the CAS memory control signal 120) that is led from the barn (the memory controller 203) and pre-positioned in the starting gate (the CAS register 225); the horse begins to run only when a start signal (the clock signal 112) is used to open the gate.

On the other hand, in the normal mode (e.g., in a system without a large amount of memory and no CAS register 225), the memory controller 203 generates normal CAS memory control signals on the line 120. Those signals are received in the usual manner directly by the memory array 115. Compared to the high-performance mode memory control signal 120, the normal-mode memory control signal 120 can be thought of as being delayed one clock cycle by the memory controller 203. Because in normal mode a CAS memory control signal is generated one clock cycle later than in high-performance mode, in normal mode the memory controller 203 is configured to sample the data from the memory array at least one clock cycle later than in high-performance mode.

As shown in FIG. 2C, the normal mode of operation can be analogized to a horse that goes directly from the barn to the track, in contrast to the high-performance mode in which the horse is pre-positioned at the starting gate. Because it may be difficult to control or predict exactly when the horse will leave the barn in normal operation, it can likewise can be difficult to predict when the horse will arrive at various points on the track; likewise, in normal mode it may be difficult to predict when the CAS memory control signal 120 generated by the memory controller 203 will arrive at various points in the memory array 115. That may be an acceptable state of affairs in some situations, whereas in others it may be more desirable to use the high-performance mode described above to get a more precise "start time."

As shown in more detail in FIG. 6, the performance control register 600 configures a memory controller and allows the memory control signal timing of each bank of memory to be programmed. Thus, a memory controller operating in the high-performance mode can be configured to generate a memory control signal at a different time relative to a memory control signal that is generated in the normal mode of operation. The performance control register 600 may be initialized after system power-up by the firmware, or by requiring certain pins to remain in selected states during power-up providing the adaptability to computer systems with varying amounts of memory. These techniques are well known to those skilled in the art.

Figure 7:
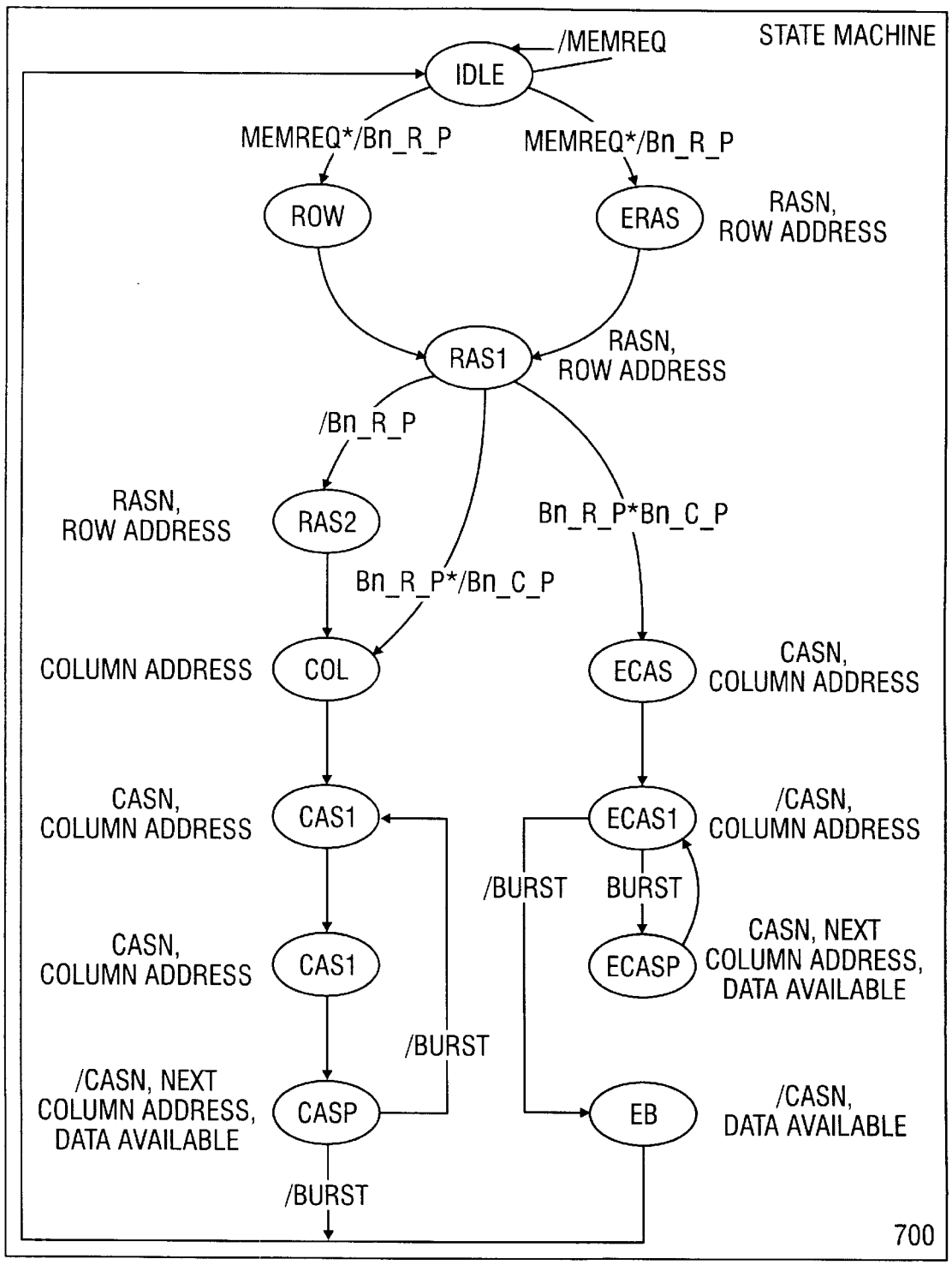
FIG. 7 is a state-machine diagram of the operation of an illustrative memory subsystem in accordance with the invention.

The operation of the memory controller 203 may be illustrated by a state-machine diagram 700 as shown in FIG. 7. The memory controller 203 has two modes of operation which generates memory timing. In the normal mode of operation, the memory controller 203 outputs its signals directly to the memory array 115, while during the high-performance mode of operation the signals are transmitted one clock cycle early allowing for external synchronization. FIG. 7 illustrates the operation of a memory controller using the state machine 700 in which the memory banks are EDO DRAM which interface with the performance control register 600. As can be seen in FIG. 7, numerous states may be bypassed when performance options are enabled; this is especially evident during a burst operation.

The selection of an operation mode enables the memory controller 203 to be used in systems with varying amounts of capacitance arising from varying amounts of available memory. In the normal mode, increasing the amount of memory increase the capacitance of the memory array 115, which in turns worsens the clock-to-signal skew of the memory control signals generated by the memory controller 203. To reduce the effect of the clock-to-signal skew, the normal CAS memory control signal is delayed one clock cycle relative to the generation of a high performance mode signal. As would be apparent to one skilled in the art, delaying a CAS memory control signal, as described above, is equivalent to not producing the early, high performance CAS memory control signal.

4.3 Other Embodiments

Figure 3:
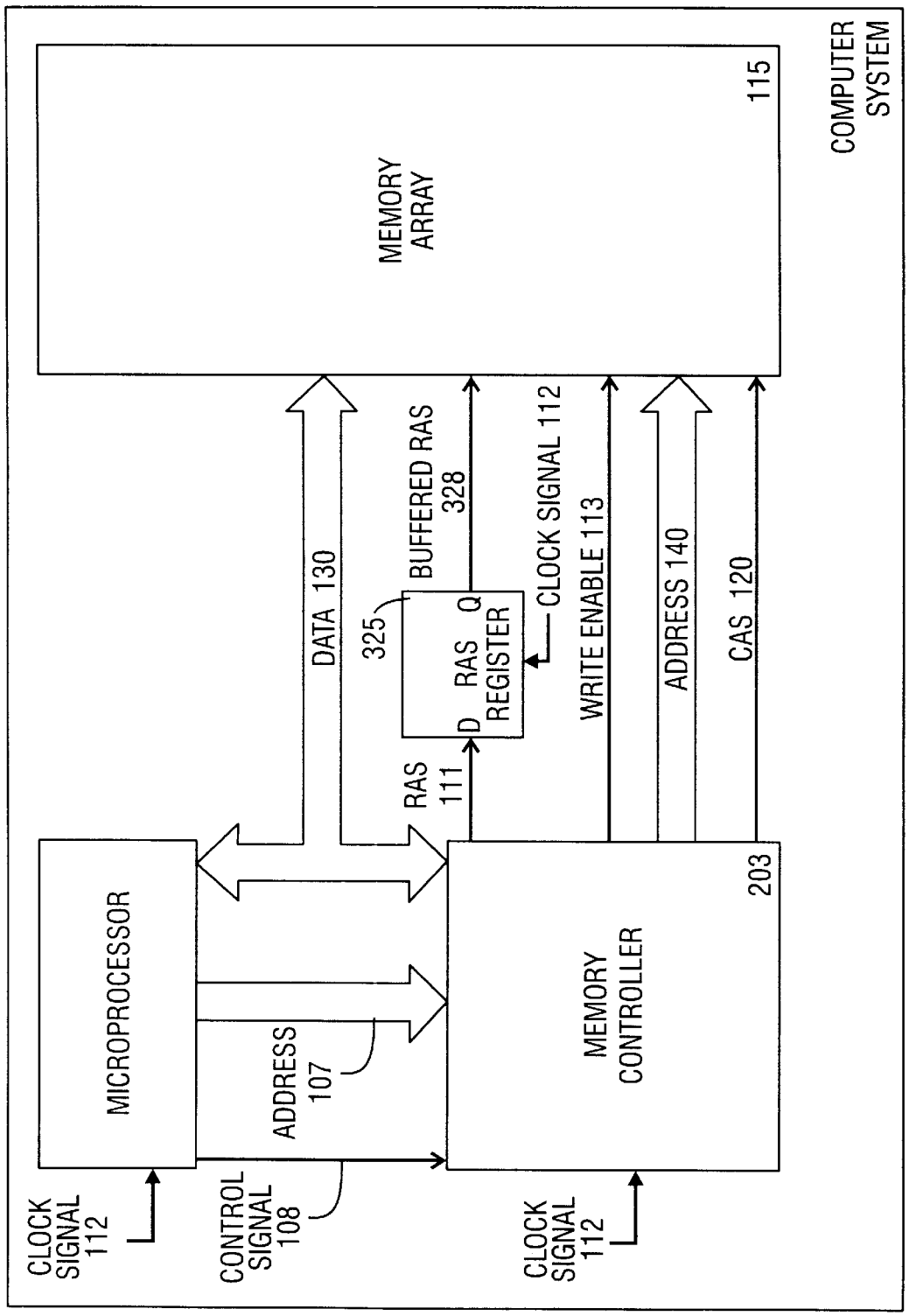
FIG. 3 is a block diagram of an RAS-register embodiment of the invention.
Figure 4:
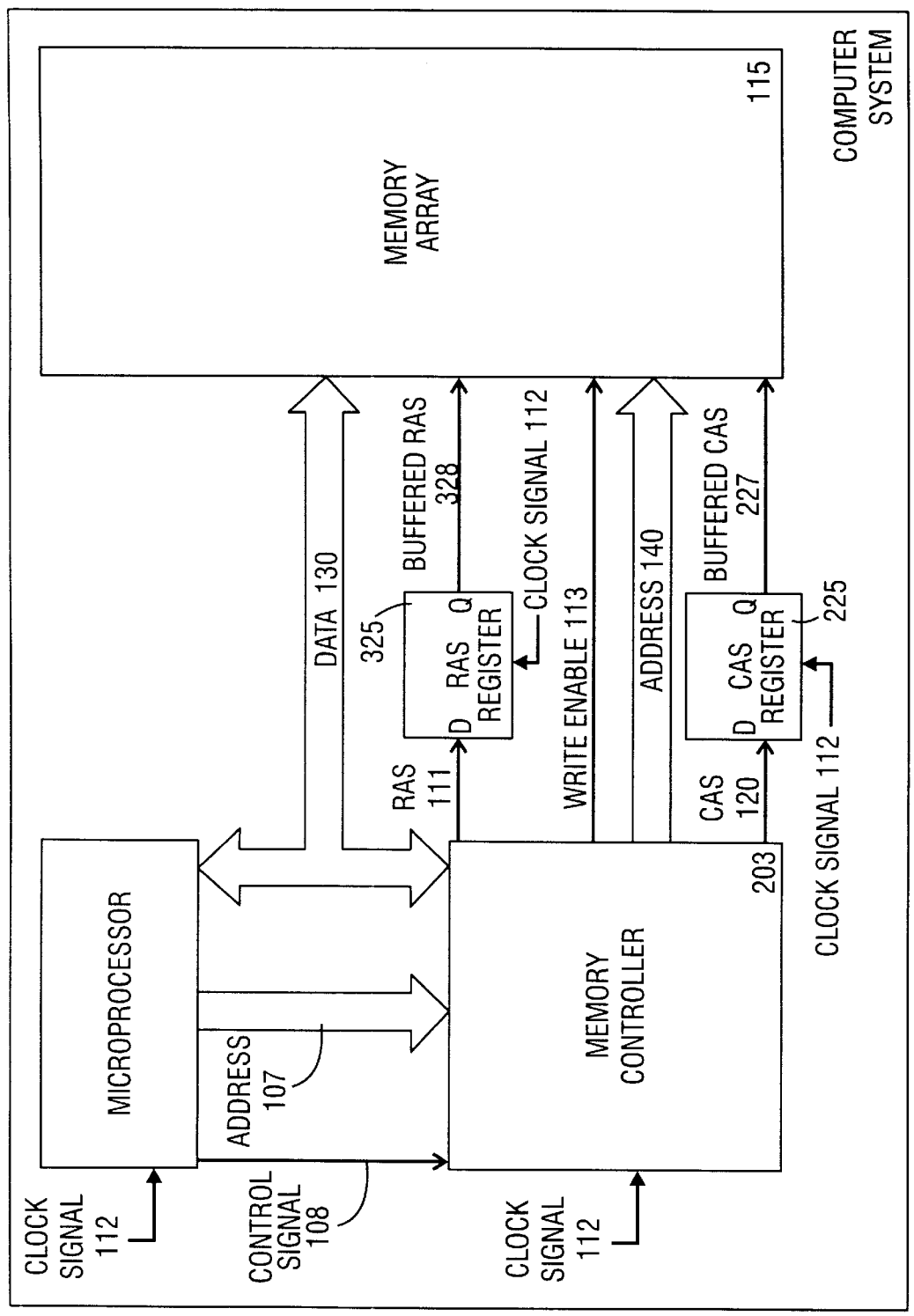
FIG. 4 is a block diagram of an embodiment containing both a CAS register and an RAS register.

Other embodiments of the invention are shown in FIGS. 3 and 4. In FIG. 3, the RAS signal 111 is buffered by a RAS register 325 in the same general manner as described above, with a buffered RAS signal 328 being generated, but the CAS signal 120 is not buffered. In FIG. 4, both the RAS signal 111 and the CAS signal 120 are buffered as described above. This embodiment may be useful for very high-performance systems where cost is a secondary consideration. Buffering both the high-performance CAS and RAS memory control signals helps promote maximum performance of the computer system shown in FIG. 4.

4.4 Remarks

Figure 5:
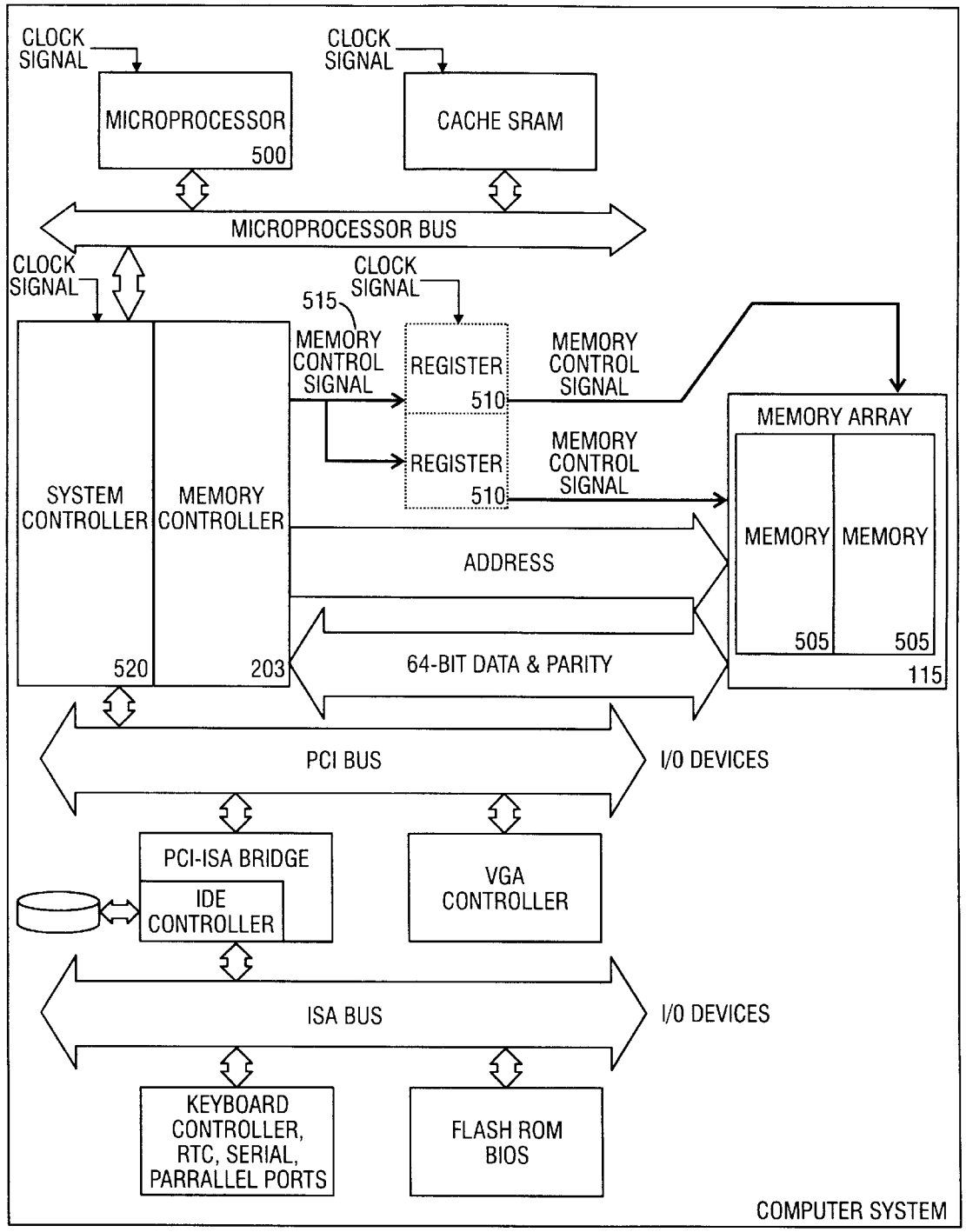
FIG. 5 illustrates a computer system utilizing a computer processor and memory subsystem in accordance with the invention.

It will be appreciated by those of ordinary skill in the art having the benefit of this disclosure that numerous variations from the foregoing illustration will be possible without departing from the inventive concept described therein. For example, a memory controller arrangement in accordance with the invention can be used in a graphics display subsystem (i.e., a video card) or using alternative types of buses (e.g., a PCI bus). FIG. 5 illustrates a computer system with a processor 500 and a memory subsystem in accordance with the invention. In this embodiment, multiple banks of memory 505 are shown with optional registers 510 in the paths of the memory control signals 515 directed to each bank of memory 505 in the memory array 115.

Accordingly, it is the claims set forth below which are intended to define the exclusive rights claimed.

What is claimed is:

1. A computer system including an apparatus for reducing clock-to-signal skew comprising:
   a) a clock generating a clock signal;
   b) a bus master operatively coupled to receive the clock signal and to generate an address signal;
   c) a memory controller operatively coupled to the clock and the bus master to receive the clock signal and the address signal, and configurable to be operated in at least one of a high-performance mode and a normal mode wherein:
      i) in the high-performance mode, the memory controller generates at least one high-performance memory control signal, and
      ii) in the normal mode, the memory controller generates at least one normal memory control signal at least one clock cycle later than a corresponding high-performance memory control signal would have been generated;
   d) a register operatively coupled to receive the clock signal and a high-performance memory control signal and configured to generate a buffered memory control signal; and
   e) a memory array having an I/O line and stored data, the memory array operatively coupled to receive the buffered memory control signal and to route a portion of the data when it is sampled by the clock signal.

2. The computer system of claim 1 wherein the bus master is a microprocessor.

3. The computer system of claim 1 wherein the bus master is a PCI device.

4. The computer system of claim 1 wherein the memory control signal is selected from the group consisting of a column-address strobe (CAS) signal and a row-address strobe (RAS) signal.

5. The computer system of claim 1 wherein the memory array comprises at least one memory device selected from the group consisting of a DRAM, an EDO DRAM, and a synchronous DRAM.

6. A computer system including an apparatus for reducing clock-to-signal skew comprising:
   a) a clock signal;
   b) a microprocessor operatively coupled to receive the clock signal and configured to generate an address signal;
   c) a memory controller operatively coupled to the clock and the microprocessor to receive the clock signal and the address signal, and configurable to be operated in at least one of a high-performance mode and a normal mode wherein:
      i) in the high-performance mode, the memory controller generates at least one high-performance CAS memory control signal, and
      ii) in the normal mode, the memory controller generates at least one normal memory control signal at least one clock cycle later than a corresponding high-performance CAS memory control signal would have been generated;
   d) a register operatively coupled to receive the clock signal and a high-performance memory control signal and configured to generate a buffered memory control signal; and
   e) a memory array having an I/O line and stored data, the memory array operatively coupled to receive the buffered memory control signal and to route a portion of the data when it is sampled by the clock signal.

7. A computer system including an apparatus for reducing clock-to-signal skew comprising:
   a) a clock, configured to generate a clock signal;
   b) a microprocessor operatively coupled to receive the clock signal and configured to generate an address signal;
   c) a memory controller operatively coupled to the clock and the microprocessor to receive the clock signal and the address signal, and configurable to be operated in either a high-performance mode or a normal mode wherein:
      i) in the high-performance mode, the memory controller generates at least one high-performance memory control signal,
      ii) in the normal mode, the memory controller generates at least one normal memory control signal at least one clock cycle later than a corresponding high-performance memory control signal would have been generated, and
   d) a memory array having an I/O line and stored data, the memory array operatively coupled to receive a normal memory control signal and to route a portion of the data when it is sampled by the clock signal.

8. A method, executed by a computer system having a bus master, a memory controller, a memory control signal register, and a memory array, of generating a memory control signal for the memory array in either a high-performance mode or a normal mode, the method comprising:
   a) the bus master sending an address signal to the memory controller;
   b) the memory controller sending a memory control signal to the memory control signal register, wherein the memory controller sends the memory control signal to the memory control signal register at least one clock cycle earlier in the high-performance mode than in the normal mode; and
   c) the memory control signal register sending the memory control signal to the memory array upon the occurrence of a synchronization event.

9. The method of claim 8 wherein the memory control signal is selected from the group consisting of a column-address strobe (CAS) signal and a row-address strobe (RAS) signal.

10. The method of claim 9, wherein the memory controller generates the memory control signal at the same edge of a clock signal in high-performance mode as it would have generated the memory control signal in normal mode.

11. The method of claim 8 wherein the memory array is at least one of a DRAM, EDO DRAM, and a, synchronous DRAM.

12. A memory controller configurable to operate in either a high-performance mode or a normal mode, wherein:
   a) in the high-performance mode, the memory controller generates at least one memory control signal comprising a high-performance memory control signal; and
   b) in the normal mode, the memory controller generates at least one memory control signal comprising a normal memory control signal at least one clock cycle later than a corresponding high-performance memory control signal would have been generated.

13. The memory controller of claim 12 wherein the memory control signal is selected from the group consisting of a column-address strobe (CAS) signal and a row-address strobe (RAS) signal.

14. A graphics display sub-system comprising a memory controller in accordance with claim 12.

15. A memory controller configured to generate a memory control signal and configurable to operate in either a high-performance mode or a normal mode, wherein the memory controller generates the memory control signal at least one clock cycle earlier in high-performance mode than in normal mode.

* * * * *